(12) United States Patent
Ranade et al.

(10) Patent No.: US 10,329,074 B2
(45) Date of Patent: Jun. 25, 2019

(54) METHOD OF MAKING A THERMALLY INSULATED SHIPPER

(71) Applicant: Sonoco Development, Inc., Hartsville, SC (US)

(72) Inventors: Ajit Ranade, Naperville, IL (US); John Stephan, Sheridan, IN (US)

(73) Assignee: Sonoco Development, Inc., Hartsville, SC (US)

( * ) Notice: Subject to any disclaimer, the term of this patent is extended or adjusted under 35 U.S.C. 154(b) by 352 days.

(21) Appl. No.: 14/938,966

(22) Filed: Nov. 12, 2015

(65) Prior Publication Data
US 2016/0059448 A1     Mar. 3, 2016

Related U.S. Application Data

(62) Division of application No. 13/908,607, filed on Jun. 3, 2013, now Pat. No. 9,272,475.

(51) Int. Cl.
| | |
|---|---|
| *B29C 45/14* | (2006.01) |
| *B65D 81/38* | (2006.01) |
| *B29D 22/00* | (2006.01) |
| *B29C 44/06* | (2006.01) |
| *B29C 43/18* | (2006.01) |
| *B29C 43/20* | (2006.01) |
| *B29C 43/56* | (2006.01) |
| *B29K 25/00* | (2006.01) |
| *B29L 31/00* | (2006.01) |

(52) U.S. Cl.
CPC ........ *B65D 81/3816* (2013.01); *B29C 43/183* (2013.01); *B29C 43/203* (2013.01); *B29C 44/06* (2013.01); *B29D 22/003* (2013.01); *B65D 81/3813* (2013.01); *B65D 81/3823* (2013.01); *B29C 45/14* (2013.01); *B29C 45/14467* (2013.01); *B29C 2043/189* (2013.01); *B29C 2043/566* (2013.01); *B29C 2045/14524* (2013.01); *B29K 2025/06* (2013.01); *B29L 2031/7162* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 1,978,985 | A * | 10/1934 | Cobb | B29C 45/14 264/250 |
| 4,060,577 | A * | 11/1977 | Collins | B29C 55/24 229/400 |
| 4,495,125 | A * | 1/1985 | Hatakeyama | A45D 34/00 264/132 |
| 4,749,532 | A * | 6/1988 | Pfeffer | B29C 44/1247 264/257 |

(Continued)

FOREIGN PATENT DOCUMENTS

| | | | |
|---|---|---|---|
| DE | 10301318 | * | 1/2003 |
| EP | 0660057 B1 | | 11/1994 |

(Continued)

*Primary Examiner* — Edmund H Lee
(74) *Attorney, Agent, or Firm* — Miller, Matthias & Hull LLP

(57) ABSTRACT

A method of making a thermally insulated shipper for a temperature sensitive payload is provided. The shipper comprises vacuum insulated panels located between inner and outer molded shells.

4 Claims, 9 Drawing Sheets

(56) References Cited

U.S. PATENT DOCUMENTS

| | | | |
|---|---|---|---|
| 5,095,674 A * | 3/1992 | Huettemann | E04B 5/04 264/34 |
| 5,798,154 A | 8/1998 | Bryan | |
| 5,989,371 A * | 11/1999 | Nishimoto | E04B 1/803 156/73.6 |
| 6,244,458 B1 | 6/2001 | Frysinger | |
| 6,325,281 B1 * | 12/2001 | Grogan | B65D 81/3862 220/592.25 |
| 6,405,556 B1 * | 6/2002 | Bucholz | F25D 3/06 165/201 |
| 6,765,031 B2 | 7/2004 | Salyer et al. | |
| 7,908,870 B2 | 3/2011 | Williams et al. | |
| 7,913,511 B2 | 3/2011 | Meyer et al. | |
| 2001/0042449 A1 | 11/2001 | Copenhaver et al. | |
| 2002/0134962 A1 | 9/2002 | Romero | |
| 2002/0147242 A1 * | 10/2002 | Salyer | C08J 9/0009 521/50 |
| 2003/0082357 A1 | 5/2003 | Gokay et al. | |
| 2003/0197307 A1 * | 10/2003 | Kitamura | B29C 45/0416 264/255 |
| 2003/0234255 A1 | 12/2003 | Hagopian et al. | |
| 2004/0020236 A1 * | 2/2004 | Vince, II | B60H 1/00014 62/434 |
| 2005/0224501 A1 | 10/2005 | Folkert et al. | |
| 2006/0277938 A1 * | 12/2006 | Meyer | F25D 11/003 62/371 |
| 2008/0006628 A1 | 1/2008 | Goncharko et al. | |
| 2008/0280120 A1 * | 11/2008 | Fechner | E04B 1/803 428/304.4 |
| 2010/0072211 A1 | 3/2010 | Dickinson | |
| 2010/0326993 A1 | 12/2010 | Mayer et al. | |
| 2012/0187019 A1 | 7/2012 | Tippet | |
| 2013/0305535 A1 | 11/2013 | Cur | |
| 2014/0054297 A1 | 2/2014 | Patstone | |
| 2015/0260331 A1 * | 9/2015 | Shinohara | B60R 13/0815 428/35.4 |

FOREIGN PATENT DOCUMENTS

| | | | |
|---|---|---|---|
| EP | 2022727 A1 | | 8/2007 |
| EP | 2022728 | * | 2/2009 |
| EP | 2412613 | * | 2/2012 |
| JP | 55093435 | * | 7/1980 |
| JP | 02233383 | * | 9/1990 |
| JP | 2005188714 | * | 7/2005 |
| WO | WO2009019251 | * | 2/2009 |
| WO | 2011046940 A1 | | 4/2011 |

* cited by examiner

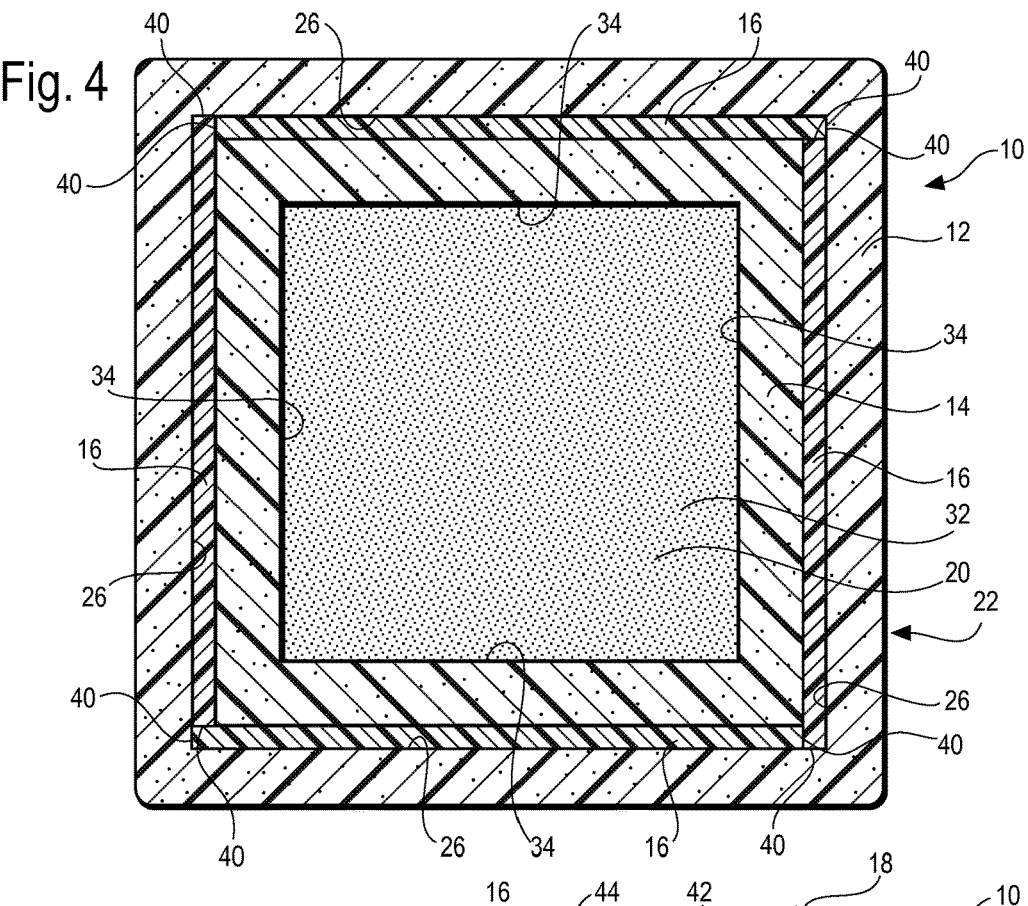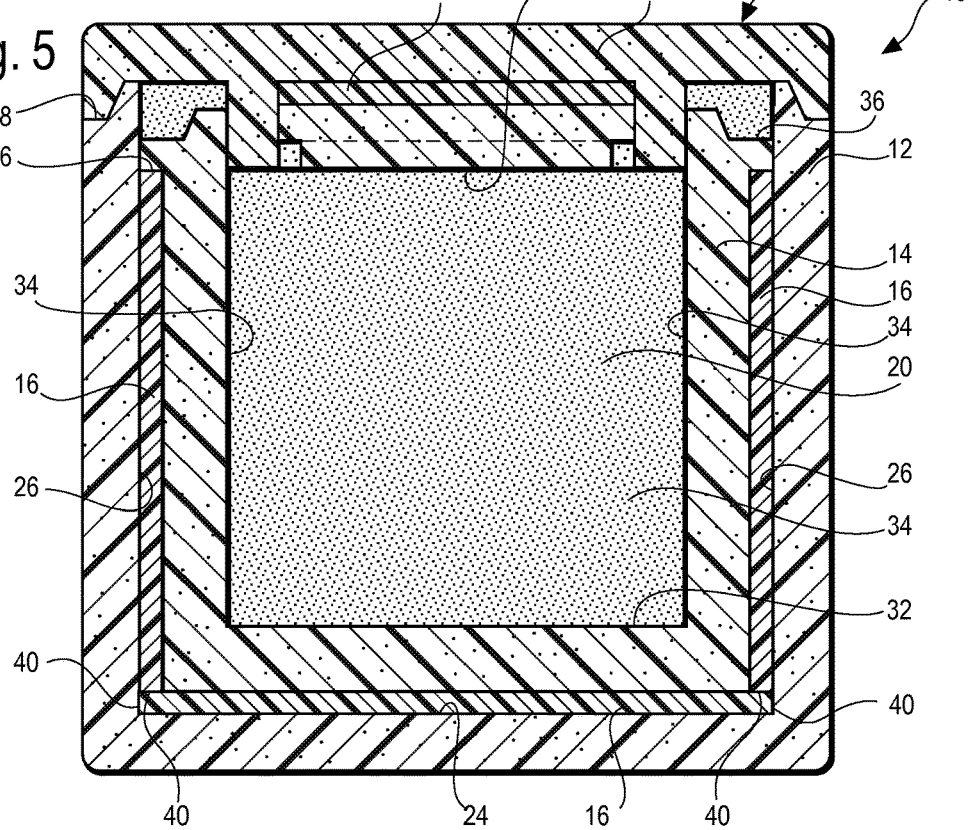

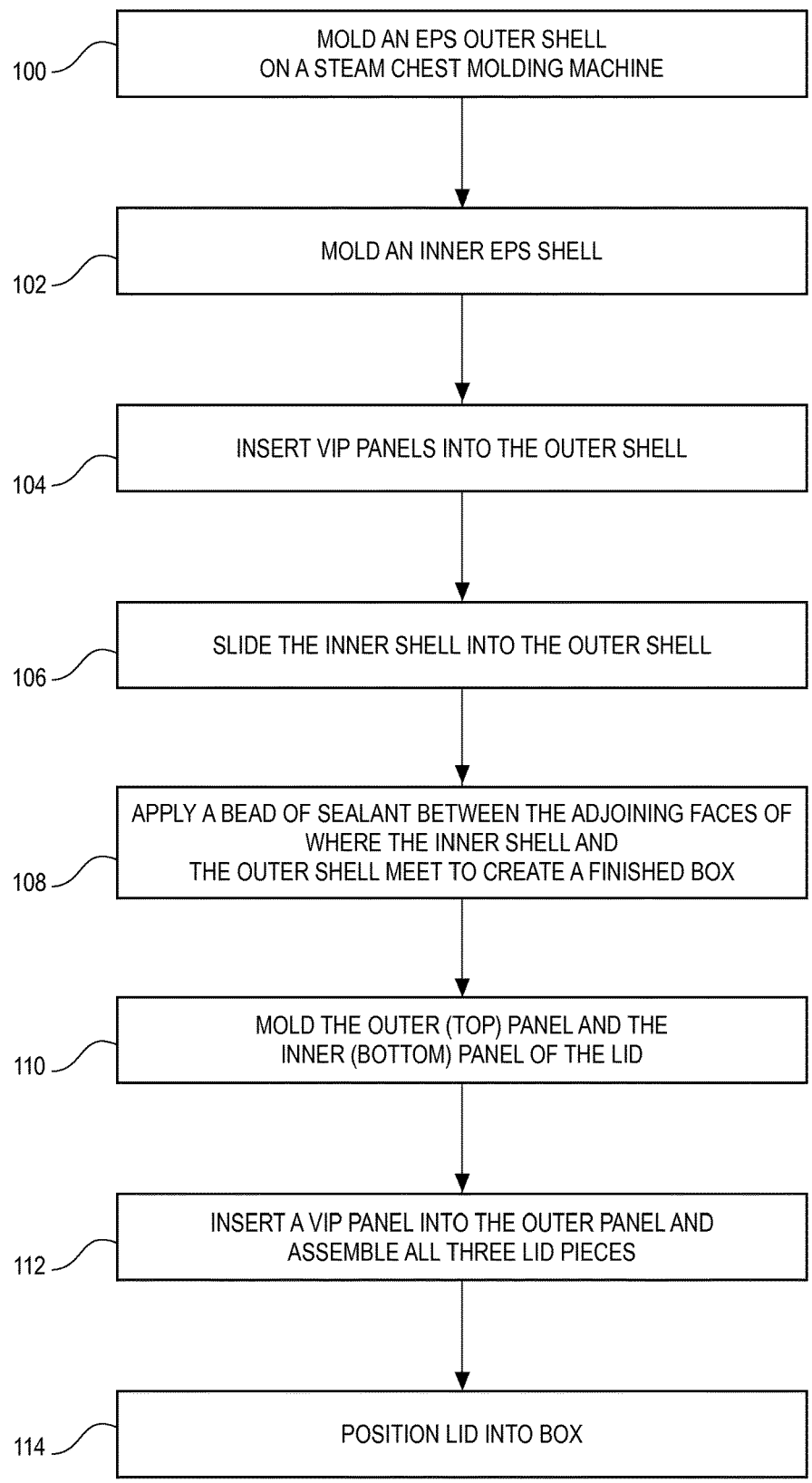

METHOD OF MAKING A THERMALLY INSULATED SHIPPER

CROSS REFERENCE TO RELATED APPLICATION

This application is a divisional of U.S. patent application Ser. No. 13/908,607, filed Jun. 3, 2013, now U.S. Pat. No. 9,272,475.

FIELD OF THE INVENTION

This invention relates to a method of making a thermally insulated shipper for shipping temperature sensitive payloads. More particularly, this invention relates to a method of making a thermally insulated shipper for shipping temperature sensitive payloads that avoids the disadvantages of prior insulated containers while affording additional structural and operating advantages.

DESCRIPTION OF THE RELATED ART

Thermally insulated shippers are used to ship perishable materials such as pharmaceuticals, blood and blood products, transplant organs and food products which must be maintained within a certain temperature range. The shipping and transportation of various perishable materials frequently requires that such materials be maintained in a stable temperature range either higher or lower than the ambient temperatures to which the packaging will be exposed. A number of different types of thermally insulated containers have been developed for this purpose. They generally fall into two main categories, active shippers and passive shippers.

Active shippers are those in which the internal temperature is controlled using a battery operated device or electrical power cord. These systems usually are expensive and quite bulky.

Passive shippers are those in which the internal temperature is maintained without any battery or electrical support. Different materials may be used to control the temperature, such as phase change material (material which can absorb or release heat depending on the surrounding temperature), gel bricks (ice bricks), dry ice etc.

There are at least three types of passive shippers:

1. EPS shippers. EPS shipper are made out of expanded polystyrene foam (EPS) and may use a combination of other components such as a corrugated box, vacuum insulation panels, phase change materials, gel bricks and dry ice. Expanded foam shippers can also be made out of other types of expanded foam including but not limited to expanded polypropylene (EPP), expanded polystyrene/polyethylene and expanded polyethylene (EPE).

2. Vacuum Insulated Panel (VIP) shippers. A vacuum insulated panel is a product composed of a rigid, highly-porous nano size material core made from fused silica, aerogel, or glass fiber that is surrounded by a metalized or non-metallized plastic film enclosure that is vacuum packed and nearly hermetically sealed so as to remove any remnant air particles within the enclosure. The principal reason why VIP panels are highly sought after as material for use in insulation is due to their exceptionally high thermally insulating properties. For example, EPS and polyurethane, which are typical insulating materials, have an R value of about 4-4.5 and 5-6 hr-ft$^2$-° F./BTU-in respectively, whereas the Rvalue for a VIP panel of the same thickness is typically 35-40 hr-ft$^2$-° F./BTU-in or more. In order for EPS or polyurethane to be as effective as a VIP panel, the same EPS or polyurethane sheets would need to be made about seven or eight times thicker. An open topped box of VIP panels can be made from five individual panels taped together using packaging tape or strapped together using band straps.

3. Polyurethane (PUR) shippers. PUR shippers are made by adding liquid PUR mix (a mixture of isocyanate, polyol, catalysts, blowing agents) into a corrugated box and then curing (foaming) the liquid.

The use of most if not all of these passive shippers involves several challenges and problems:

Edge Leaks

A typical VIP shipper is made by assembling five individual VIP panels and securing the panels together using packaging tape or strapping using band strap. Despite the care given to assembly there can be significant air gaps (edge leaks) formed during the assembly. These gaps are almost impossible to eliminate due to the often uneven shape of VIP panels around the edges. Even though individual panels may have an R value of up to 40/inch, the overall shipper R value may be anywhere between 25-30, a 25-30% drop. The drop in R value is due to the edge leaks. This is also one of the main reasons packaging system consisting essentially of VIP panels are having difficulty being successful in the insulated shipper market. They are expensive, and their insulative benefits are greatly compromised due to edge leaks.

Edge leaks in general occur when two adjoining walls of material are not completely in contact/flush with one and another and therefore create a visible gap, also known as a thermal bridge. This thermal bridge creates a path of least resistance for heat to transfer through, thus making all even high R-value materials ineffective at preventing thermal transmissions. The R-value of the entire system is compromised and languishes to levels of systems with no VIP panels. Simply adding additional thermal insulation to enclosure is of little benefit; the thermal bridge must be minimized or eliminated completely in order for the system's R-value to be substantially enhanced.

The majority of air leaks arise in circumstances where manual labor is used to assemble the final product and where the mating surfaces of the components being connected together are irregularly shaped or highly unrefined. (Edge gaps can significantly widen during the standard transportation resulting in further reduction of shipper R value.) Because the edge leaks are predominantly a function of the production control process of the particular product being manufactured, it is greatly desired that the manufacturing operations have as tight control as possible of the tolerances and procedures as cost allows. This in turn means that all manual operations should ideally be eliminated or controlled in such a way that the assembler's own experience does not weight heavily upon the final quality of the product.

Knife Defects, Puncture Defects

Vacuum (lack of gas molecules) is the primary reason why the R value of VIP panels are so high. The outside casing of these panels is made up of flexible plastic film. The R value of VIP panel without a vacuum is about 4/inch and this similar to EPS. If a VIP panel gets damaged due to puncture or rough handling then the R value drops due to the loss of the vacuum. The R value will also drop over time because the flexible plastic film is not completely impermeable to gas and moisture. However, the most common defect in shipping container that comprise VIP panels is the compromise of the flexible plastic film due to punctures or tears. VIP shippers typically are enclosed in a cardboard box. Extra care needs to be taken during unpacking and opening the box. A knife blade can easily puncture the flexible plastic film resulting in a significant drop in the R value from 40 to 4/inch. The entire shipper will fail even if the failure is just in one VIP panel.

Manual Labor Requirements

As briefly mentioned above, the method currently used to create VIP boxes demands heavily upon manual manipulation, an inexact operation, where the individual panels are joined by the individual to hold the individual panels temporarily into place while wrapping and attaching adhesive bindings such as tape or straps to compress the panels together, a requirement that is dictated by the need to minimize edge leaks. Because there currently are no technologies to instantly determine what the operating R-value is of the final package, or even in a relatively short period of time, there is no reliable method to ensure the thermal quality of the final product. Due to such shortcomings, a more repeatable and controlled method is desired.

Transportation Considerations

Transportation and the resulting vibrations that occur during transporting are important factors to consider when selecting appropriate packaging needs. With current manually produced VIP panel packages, the risk of compromising the R-value properties of the package is high, especially when the package undergoes severe shock or changes in momentum, such as when falling or wildly translating about a shelf on a vehicle. Manually constructed VIP packages that are held together with adhesive tape or another binding system that was never designed to absorb impact or loads of any kind present a particular challenge. Excessive vibration or impacting of a package with a large enough amplitude during transportation can and often does create edge leakage due to air gaps between the VIP panels that deleteriously affects the performance of such packaging systems. Requiring couriers to be more gentle or use greater care when handling the package is usually beyond the control of the package maker or user. By designing a package to create a more robust and sturdy structure, the problems associated with transportation and vibration can be mitigated or even eliminated.

Special Issues Related to PUR Shippers

PUR shippers have several particular disadvantages: (1) Output: Due to the batch process and longer cycle time (15 to 40 minutes) required to make them, PUR shipper manufacturing is capital intensive. (2) Cost: PUR shippers generally are more expensive to make than EPS shippers due to the complex method of foaming the liquid, lower throughput and higher tooling costs. (3) Environmental concerns: Blowing agents such as chlorofluorocarbons (CFC) and hydrofluorocarbon (HCFC) used to produce PUR foam can cause depletion of ozone layer, so efforts and regulations have been put in place to phase out these chemicals.

The present invention is designed to solve the problems described above.

BRIEF SUMMARY OF THE INVENTION

The present disclosure relates to a method of making an improved thermally insulated VIP sandwich shipper which avoids the disadvantages of prior insulated containers while affording additional structural and operating advantages.

The packaging system comprises an outer shell, an inner shell and one or more vacuum insulated panels (VIPs) or other insulation materials sandwiched therebetween. Preferably the insulation materials have an R value greater than the outer shell and inner shell.

The outer shell may be a unitary rigid structure made of an expanded foam material and comprising a bottom having a perimeter and sides extending from the perimeter and terminating in a rim. The inner shell may also be a unitary rigid structure made of an expanded foam material and comprising a bottom having a perimeter and sides extending from the perimeter and terminating in a rim. The inner shell rim may be spaced from the outer shell rim to define a gap. The gap should be sealed to create an enclosed space between the shells.

The vacuum insulated panels may be located in the enclosed space between the outer shell and the inner shell, with each vacuum insulated panel oriented substantially orthogonally to at least one adjacent vacuum insulated panel and having an edge that abuts the adjacent vacuum insulated panels. Preferably the vacuum insulated panels are press fitted against each other and against the outer shell and the inner shell to minimize or eliminate edge leaks.

The packaging system exceeds the insulation performance of a standard PUR shipper without the use of PUR foam. The invention also matches the performance of a one inch thick VIP shipper by using only half inch thick VIP panels, thus significantly reducing the overall cost. The standard deviation (variation in R value from shipper to shipper) of the R value of the shipper is also much narrower due to the elimination of edge leaks. The elimination of edge leaks is achieved by sandwiching the VIP panels between walls of the container, thus eliminating the manual process of building a VIP box from five individual panels.

The packaging system may reduce the size and weight of the total shipper which results in a reduction in transportation costs. The shipper may be smaller than conventional shippers having similar thermal characteristics. The total cost of the shipper disclosed herein may be less than the cost of conventional PUR shippers, while eliminating the need for polyurethane. While the manufacture of PUR shippers is a batch process taking anywhere from 30 to 45 minutes per unit, a shipper according to the present disclosure can be made every 3 to 4 minutes.

The VIP sandwich shipper also may be returnable and reusable, since the VIP panels are safely protected between two layers of foam materials. Preferably the VIP panels are hidden within the container so there is no visual way of determining if there is a VIP panel inside the container.

The packaging system also greatly reduces the number of individual loose parts inside a shipper as the VIP panels are hidden inside the walls. This is a desirable characteristic for returnable and reusable shippers. In current shipper systems, it is difficult to reclaim all the parts from doctors' offices and pharmacies because the end user usually has no knowledge or understanding of the importance of the individual insulation components inside the box. Since the VIP panels of the present invention are hidden inside the walls, they cannot be damaged or lost.

The disclosure relates to an automated process for making a VIP sandwich shipper. The automated process may comprise the following steps:

molding an outer shell, the outer shell having a bottom and sides extending from the bottom;

placing VIP panels against one or more of the bottom and sides of the outer shell to create an outer shell assembly;

transferring the outer shell assembly to a steam chest insert molding machine;

positioning a male plug within the outer shell assembly, leaving a space therebetween; and molding the inner shell into the space between the outer shell assembly and the male plug. Both the outer and inner shells are made out of expanded foam. Any voids between the VIP panels and the outer shell and the inner shell may be filled with expanded foam.

In another aspect of the disclosure a method of making a thermally insulated VIP sandwich shipper for a temperature sensitive payload is provided. The method may comprise the following steps:

molding a box-shaped outer shell having a top rim;

molding a box-shaped inner shell having a top rim;

inserting into the outer shell vacuum insulated panels having edges so that all or some of the edges of each vacuum insulated panels panel will be pressed against an adjacent vacuum insulated panels panel;

sliding the inner shell into the outer shell so that the vacuum insulated panels are interposed between the inner shell and the outer shell and so that there is a gap between the outer shell top rim and the inner shell top rim;

sealing the gap between the inner shell and the outer shell to create a box;

molding an outer panel and an inner panel for use as lid components;

inserting a vacuum insulated panel between the outer panel and the inner panel and sealing the vacuum insulated panel therebetween to create a lid; and positioning the lid onto the box.

The gap may be sealed with a sealant, with the lid or both.

The outer shell may be molded using a first steam chest molding machine. The inner shell may be molded using a second steam chest molding machine having a different sized cavity than the first steam chest molding machine. Alternatively, the inner shell may be molded on the first steam chest molding machine but using a different sized cavity.

Both the outer and inner shells may be made out of expanded foam.

BRIEF DESCRIPTION OF THE DRAWINGS

FIG. 4 is a cross-sectional view of the thermally insulated VIP sandwich shipper of FIG. 3 taken along line 4-4.

FIG. 5 is a cross-sectional view of the thermally insulated VIP sandwich shipper of FIG. 3 taken along line 5-5.

FIG. 6 is a schematic diagram showing a method of making the thermally insulated VIP sandwich shipper of FIG. 1.

DETAILED DESCRIPTION OF THE INVENTION

Figure 1:
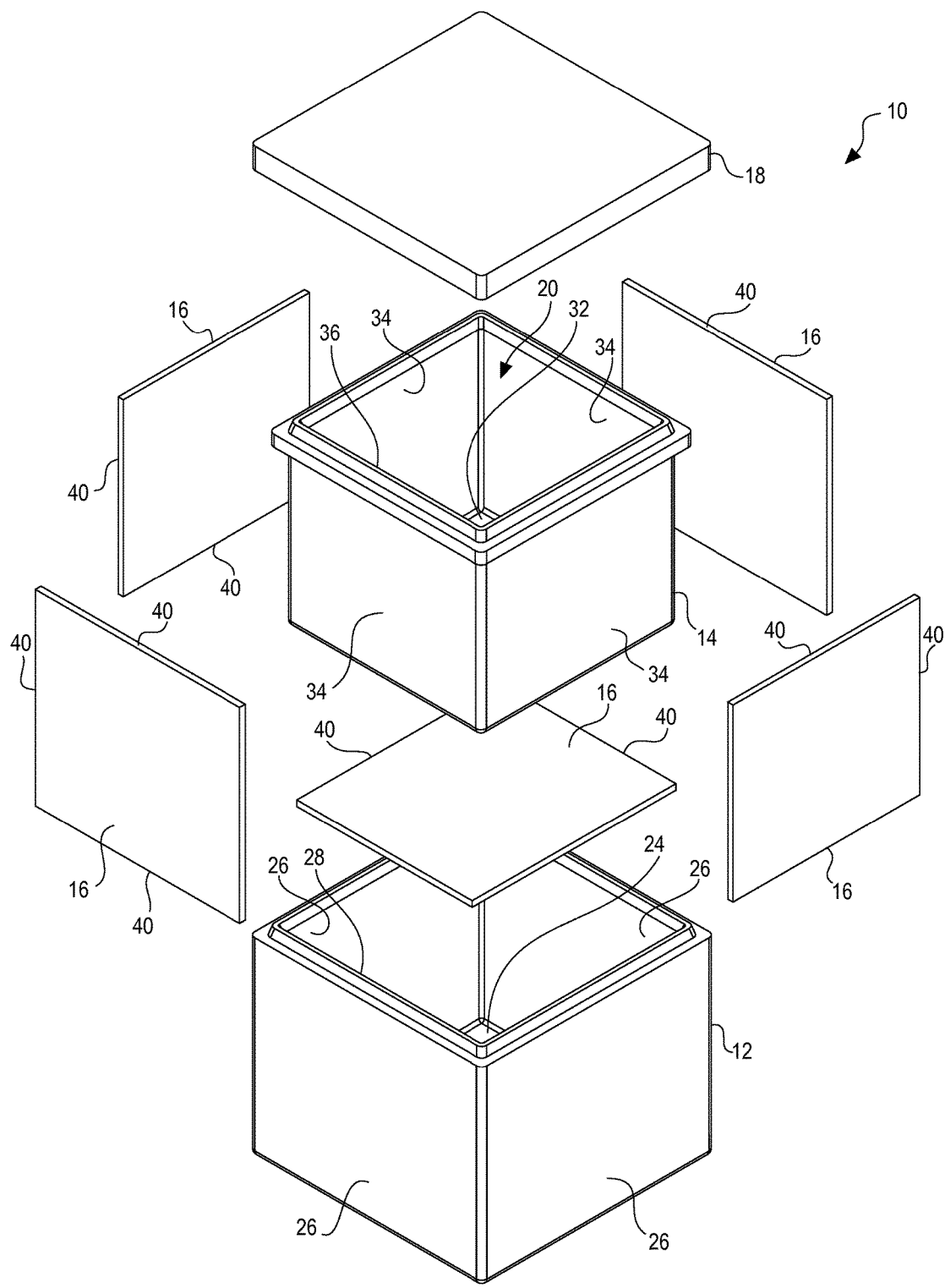
FIG. 1 is an exploded perspective view of a thermally insulated VIP sandwich shipper according to the invention.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

The Thermally Insulated VIP Sandwich Shipper

Turning to the drawings, there is shown in the figures one embodiment of the present invention, a thermally insulated VIP sandwich shipper for temperature sensitive products. As best shown in FIG. 1, the thermally insulated VIP sandwich shipper 10 comprises an outer shell 12, an inner shell 14 and one or more panels of insulation material such as vacuum insulated panels (VIPs) 16 located ("sandwiched") between the outer and inner shells 12, 14. Together the outer shell 12, inner shell 14 and VIPs 16 form a box or carton 22 onto which a lid 18 can be fitted to form the shipper 10. The box 22 and lid 18 together define a payload compartment 20.

The outer shell 12 may be made of expanded foam (such as EPS, EPP, EPS/PE) or other suitable insulative material and is basically in the shape of an open topped box. The outer shell may comprise a bottom 24 and four sides 26 extending upward from the periphery of the bottom 24 and terminating in a rim 28.

Likewise, the inner shell 14 may be made of expanded foam (such as EPS, EPP, EPS/PE) or other suitable insulative material and is basically in the shape of an open topped box, albeit smaller than the outer shell 12 so that the inner shell 14 can nest within the outer shell 12, leaving a gap therebetween for accommodating the VIP panels 16. The inner shell 14 may comprise a bottom 32 and four sides 34 extending upward from the periphery of the bottom 32 and terminating in a rim 36.

In the assembled shipper 10, the VIP panels 16 are located between the nested outer and inner shells 12, 14, which protects the VIP panels 16 from punctures or tearing. Preferably the VIP panels 16 are wedged against each other together so that the edge 40 of one VIP panel 16 abuts an adjacent VIP panel 16, thereby reducing or eliminating edge leaks. A sealant may be applied along the top rim of the shipper 10 between adjoining faces of the outer shell 12 and inner shell 14 to seal off the VIP panels 16 so they are completely enclosed. Alternatively, the lid 18 may be used to seal off the VIP panels 16 so they are completely enclosed. In yet another alternative, the outer shell 12 and inner shell 14 are sealed together along a perfect seal line 58 during the molding process.

Figure 2:
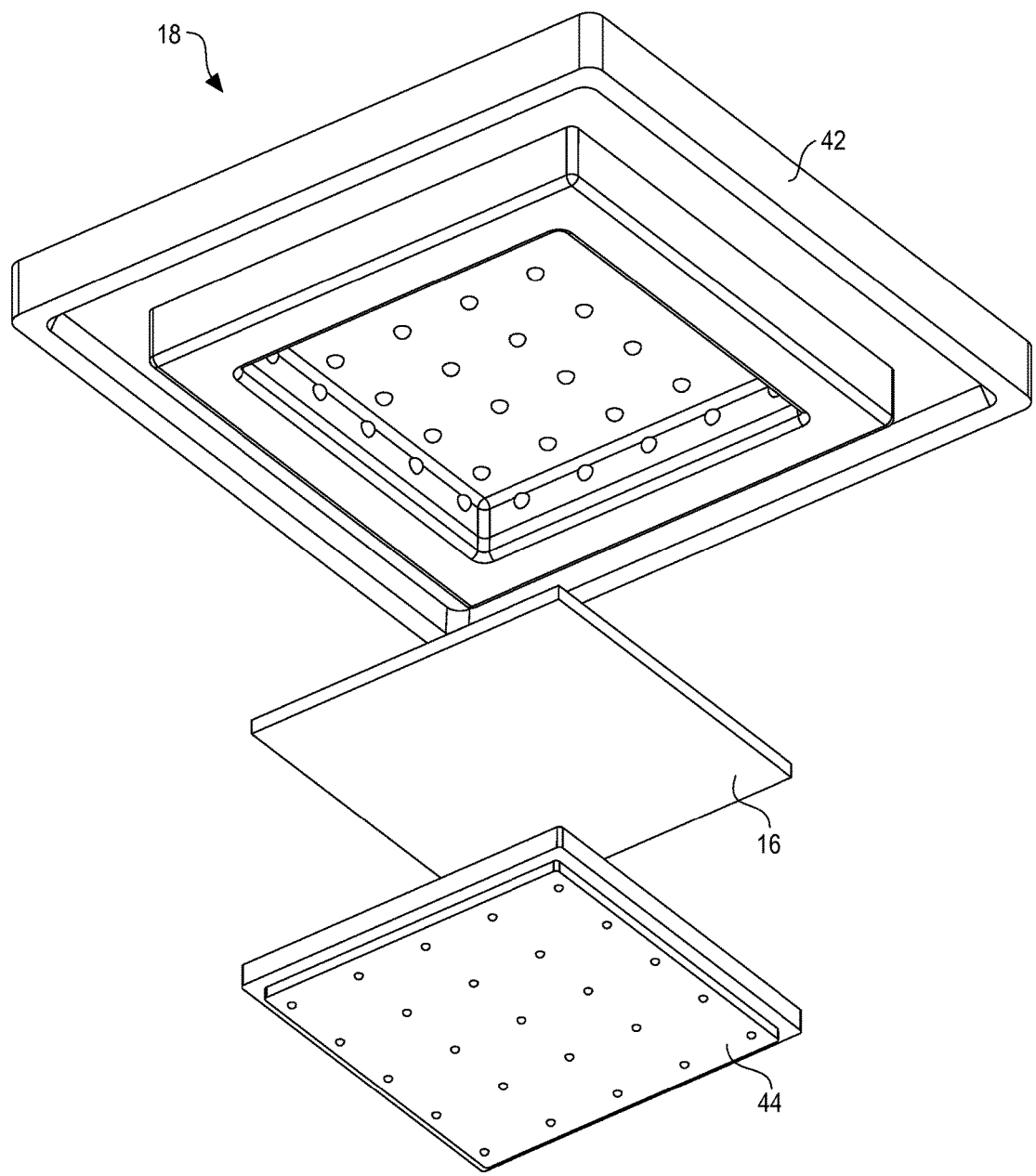
FIG. 2 is an exploded perspective view of the lid of the thermally insulated VIP sandwich shipper of FIG. 1.

FIG. 2 is an exploded perspective view of a lid 18 for use with the thermally insulated VIP sandwich shipper 10 of FIG. 1. The lid 18 may comprise a VIP panel 16 sandwiched between a top or outer panel 42 and a bottom or inner panel 44. The VIP panel 16 may be completely enclosed in the assembled lid 18 to prevent puncturing or tearing of the VIP panel 16.

Figure 3:
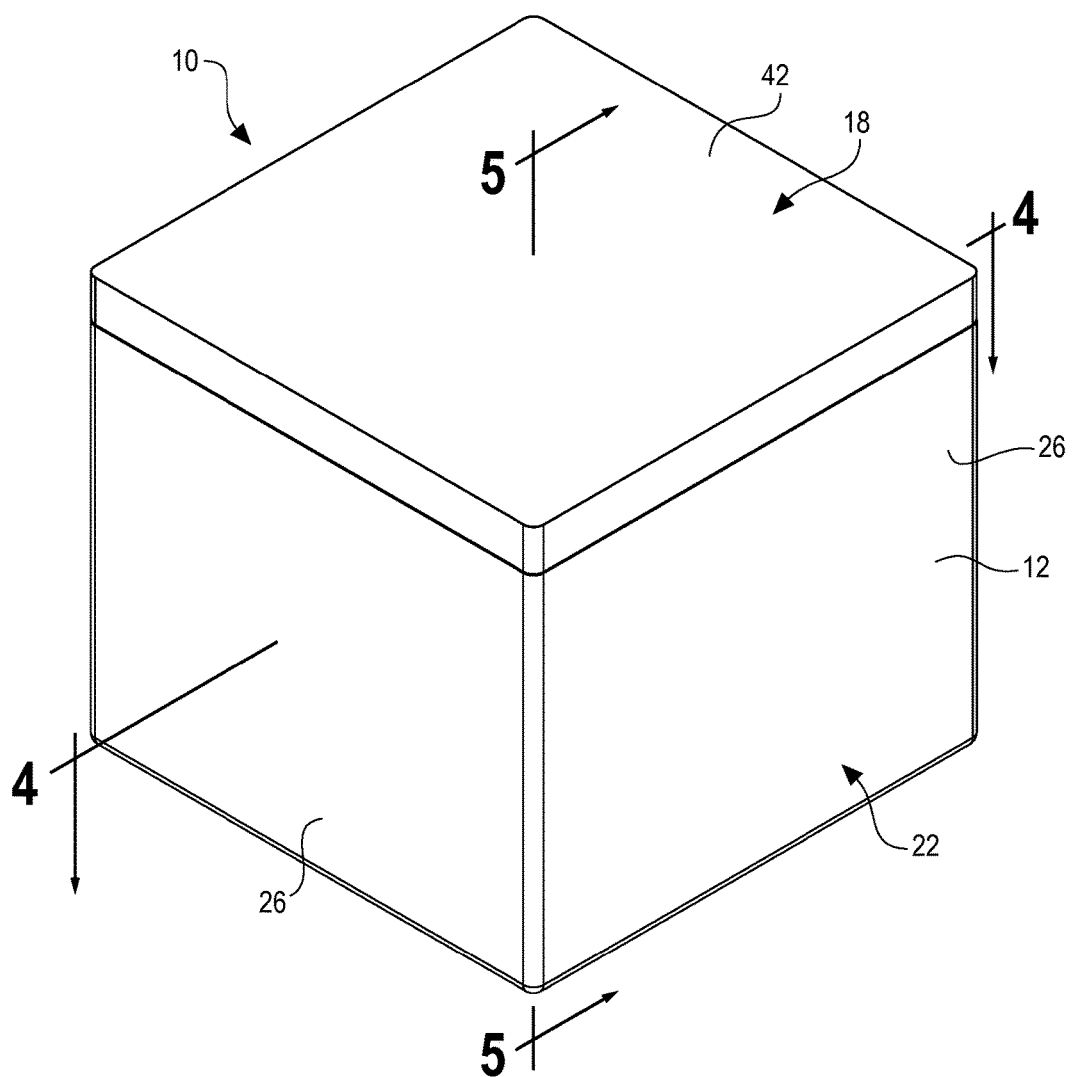
FIG. 3 is a perspective view of the thermally insulated VIP sandwich shipper of FIG. 1 shown assembled.

FIG. 3 is a perspective view of an assembled thermally insulated VIP sandwich shipper 10. The VIP panels 16 surround the payload compartment 20 on at least one and as many as six sides but cannot be seen in FIG. 3.

FIG. 4 is a cross-sectional view of the thermally insulated VIP sandwich shipper 10 of FIG. 3 taken along line 4-4. The VIP panels 16 are wedged between the outer panel 12 and the inner panel 14, preferably so that there is no space between the VIP panels 16 and the outer shell 12 or inner shell 14. In other words, the VIP panels 16 occupy the entire gap or void between the outer shell 12 and the inner shell 14. Preferably the vertical edges 40 of each VIP side panel 16 abut any orthogonally adjoining VIP side panels 16.

FIG. 5 is a cross-sectional view of the thermally insulated VIP sandwich shipper 10 of FIG. 3 taken along line 5-5.

Preferably the VIP side panels 16 extend from the VIP bottom panel 16 adjacent the outer shell bottom 24 to the top rim 36 of the inner shell 14.

The thermally insulated VIP sandwich shipper 10 may be used to package and ship temperature sensitive products. Typically these products have a specified or required temperature range that must be maintained during a specific shipping duration and while the thermally insulated VIP sandwich shipper is subject to various ambient temperature conditions. For example, a product may be expected to be shipped for 120 hours and be exposed to ambient temperatures of between −20 C and 45 C (−4 F and 113 F), but have a temperature tolerance of between 0 C and 15 C (32 F and 59 F). A thermally insulated VIP sandwich shipper according to the present disclosure may be designed to accommodate these requirements.

Method of Making the Thermally Insulated VIP Sandwich Shipper

FIG. 6 is a schematic diagram showing a method of making a thermally insulated VIP sandwich shipper 10. The thermally insulated VIP sandwich shipper 10 may be made using a steam chest molding machine to mold the expanded foam components s explained further below. The shipper 10 can also be constructed using individual panels of expanded polystyrene foam (EPS) or any other suitable thermally insulated panels including but not limited to extruded polystyrene (XPS).

Construction of the Box

The method of making the thermally insulated VIP sandwich shipper 10 may comprise the following steps:

Step 100: Mold the EPS outer shell 12 on a steam chest molding machine.

Step 102: Mold the inner EPS shell 14. This can be done on the same steam chest molding machine as was used to make the outer shell 12 (by using two different cavities) or on a different machine.

Step 104: Bring the outer shell from step 100 to the next work station and insert five (5) VIP panels (one for each of the four sides 26 of the outer shell 12 and one for the bottom 24) into the outer shell 12 so that the edges 40 of each VIP panel are pressed against the adjacent VIP panel 16 as shown in FIGS. 4 and 5. The VIP panels 16 are flexible and have resilience. They can be press fitted against each other and against the outer shell 12 and inner shell 14 to minimize or eliminate edge leaks.

Step 106: Slide the inner shell from step 102 into the outer shell assembly from step 104 (with VIP panels 16 along the four sides and bottom).

Step 108: Once both the inner shell 14 and the outer shell 12 have been combined to form the box 22, apply a bead of sealant between the adjoining faces of the inner shell 14 and the outer shell 12 near their respective rims.

This method of manufacture minimizes or eliminates edge leaks because the VIP panels 16 are wedged between the molded foam walls of the outer shell 12 and the inner shell 14 and are secured therebetween. After step 106, pressure may be applied to further press the VIP panels 16 against the walls of the outer shell 12 and the inner shell 16, thus eliminating edge leaks all together. The VIP's 16 will be protected and will be completely invisible (hidden) between the walls of the outer shell and the inner shell 14.

Construction of the Lid

Step 110: Mold the outer (top) panel 44 and the inner (bottom) panel 46 of the lid 18.

Step 112: Insert a VIP panel 16 into the outer panel 44 and assemble all three pieces as shown in FIG. 2.

Examples

As the following examples show, the thermally insulated VIP sandwich shipper may have thermal characteristics superior to those of conventional polyurethane (PUR) shippers.

Case Study 1—Box Size, Weight and Thermal Comparison

In case study 1, a reduction in container size of 40% was achieved while improving system insulation value (R value) by 55% and reducing weight by 40%. These improvements resulted in a VIP sandwich shipper that is easy to pack, lower in weight and has better thermal performance.

TABLE 1

| Shipper Type | VIP Thickness | PUR Thickness | EPS Thickness | Box Size, Inches | Box size reduction | Shipper R value improvement | Shipper weight reduction |
| --- | --- | --- | --- | --- | --- | --- | --- |
| PUR shipper | Not Present | 3 inch PUR wall | Not Present | 22.75 × 20.25 × 19.75 | | | |
| Shipper according to the disclosure | 0.5 inch | Not Present | 2 inch | 21 × 18.5 × 14 | 40% | 55% | 35-40% |

Case Study 2—Winter Ambient Profile Performance

Figure 7:
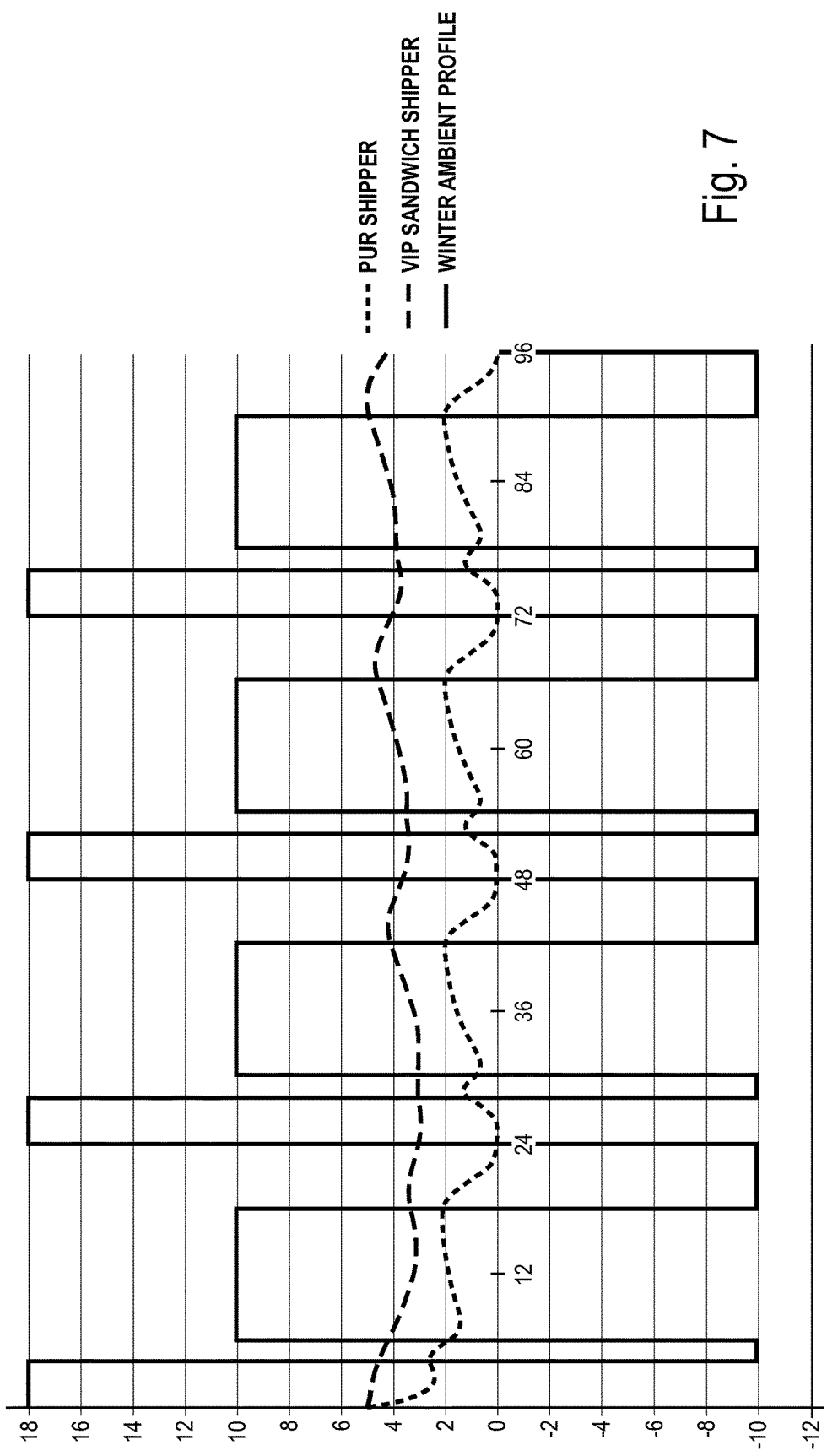
FIG. 7 is a graph comparing the thermal performance of a VIP sandwich shipper according to the disclosure to a PUR shipper for a winter ambient profile.

In case study 2, a VIP sandwich shipper was compared to a PUR shipper in conditions simulating a winter ambient temperature profile. The box size and wall thickness of the PUR shipper and the VIP sandwich shipper was kept similar. The objective was to provide a shipper for keeping pharmaceutical products between 2-8 degrees C. for a minimum 96 hours of shipping. As shown in FIG. 7, the PUR shipper failed after only 8 hours in service as the inner temperature dropped below 2 degrees C. By contrast, the VIP sandwich shipper maintained the temperature of the product between 3-5 deg C. for 96 hours.

Case Study 3—Summer Ambient Profile Performance

Figure 8:
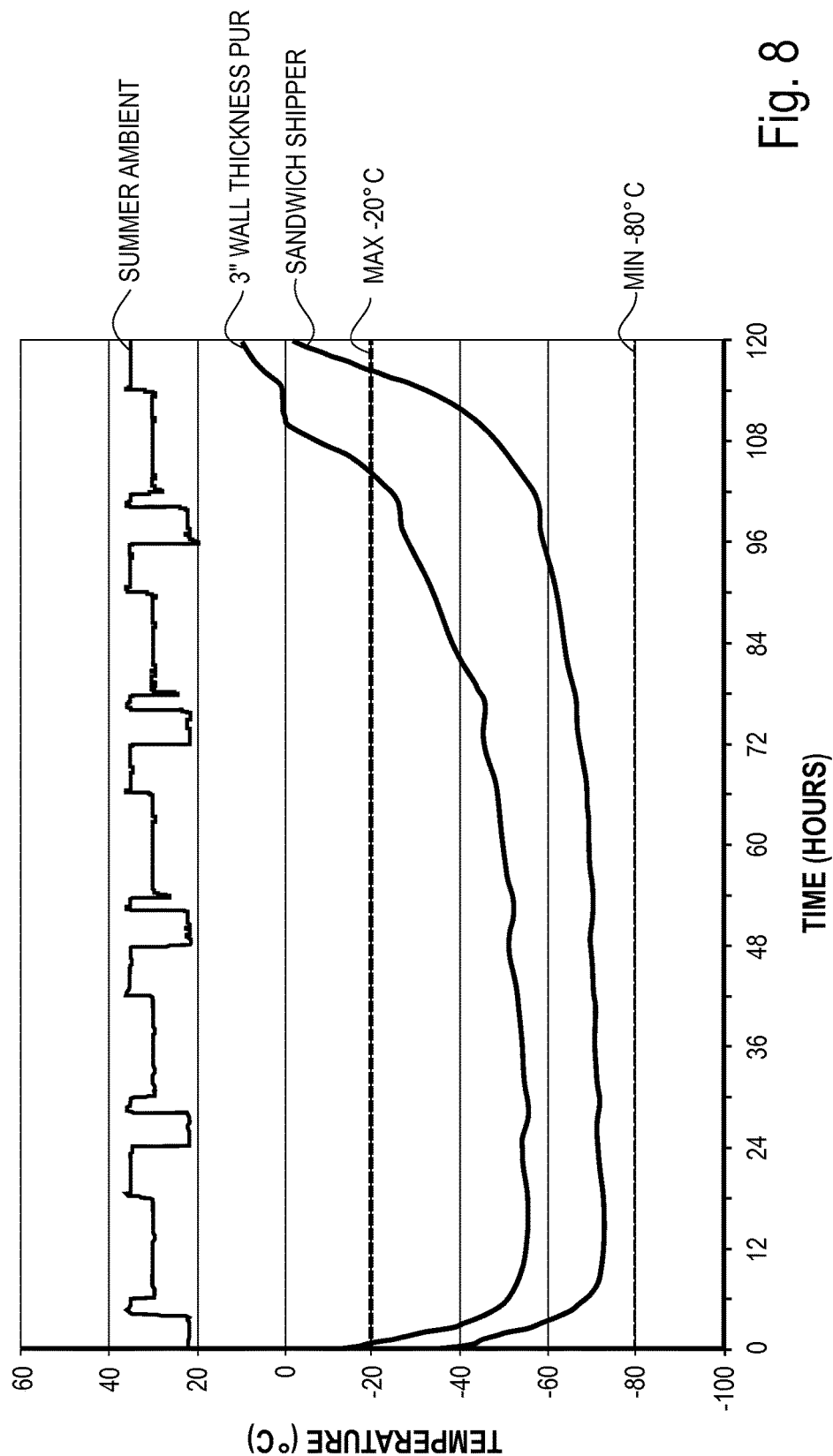
FIG. 8 is a graph comparing the thermal performance of a VIP sandwich shipper according to the disclosure to a PUR shipper for a summer ambient profile.

In case study 3, a VIP sandwich shipper was compared to a PUR shipper for a summer ambient temperature profile. The objective was to provide a shipper for keeping pharmaceutical products at temperature less than −20 degrees C. for a minimum of 96 hours. As shown in FIG. 8, the temperature inside the VIP sandwich shipper was much colder at all times and the duration below −20 degrees C. was 12 hours longer than with the PUR shipper. This improvement with the VIP sandwich shipper is very important because ambient temperature profiles often vary and the shipper can get exposed to harsh environments during summer days. The VIP sandwich shipper in case study 3 was also 20% smaller in volume and 18% lower in weight.

Case Study 4—Thermal Characteristics (R Value)

The thermally insulated VIP sandwich shipper may have thermal characteristics superior to those of a conventional VIP shipper as shown in Table 2 below:

TABLE 2

| Shipper Type | VIP Thickness | EPS Thickness | Box Size, Inches | System R value, Ft$^2$ * Hr * °F./ BTU inch |
| --- | --- | --- | --- | --- |
| VIP shipper | 1 inch | NA | 12 × 10 × 12 | 19-28 |
| Shipper according to the disclosure | 0.5 inch | 2.5 inch | 12 × 10 × 12 | 26-30 |

Method of Making the Thermally Insulated VIP Sandwich Shipper—Automatic

Figure 9:
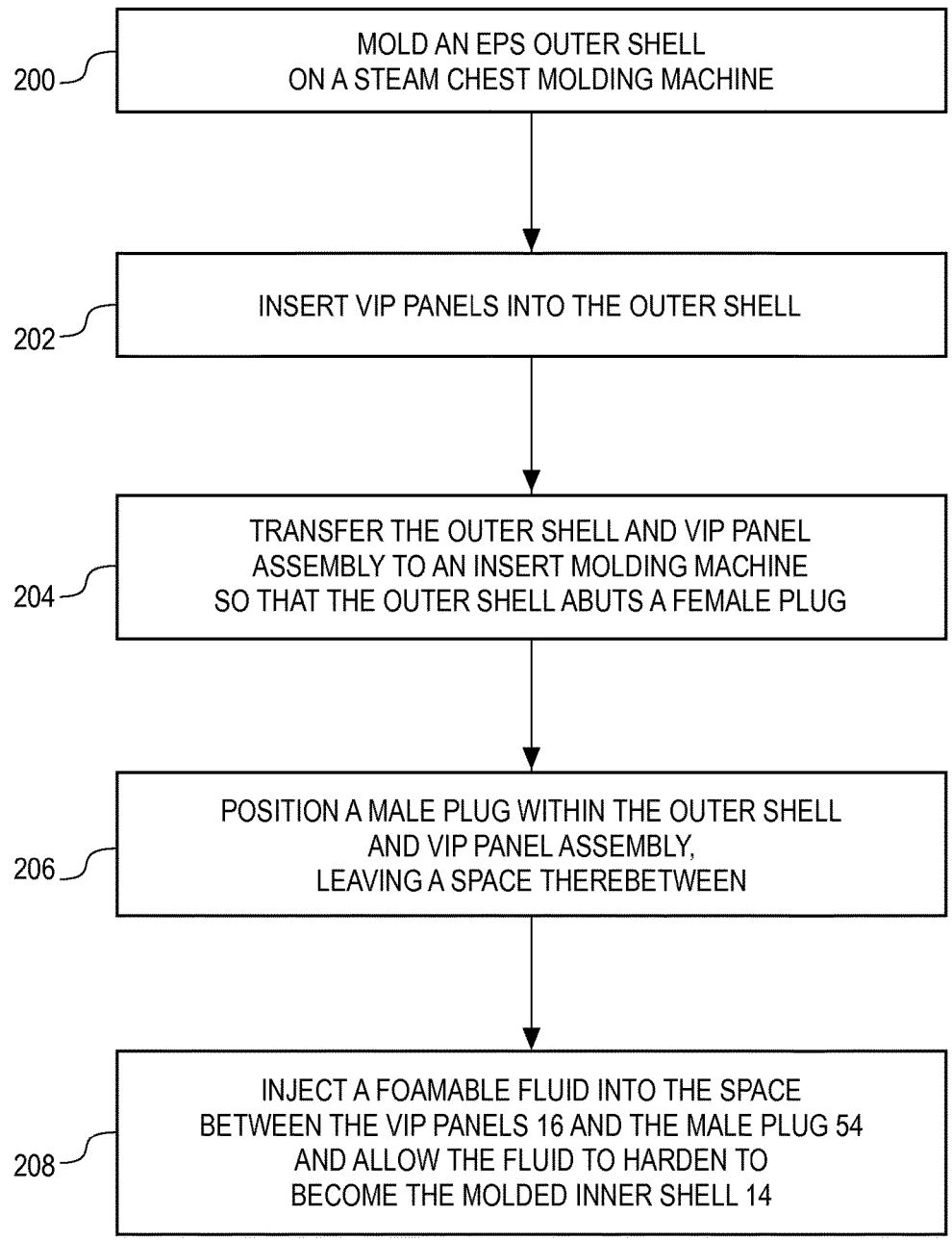
FIG. 9 is a schematic diagram showing an alternative (automated) method of making the thermally insulated VIP sandwich shipper of FIG. 1.

FIG. 9 is a schematic diagram showing an alternative (automated) method of making the box portion 22 of the thermally insulated VIP sandwich shipper of FIG. 1. The automated process for making the box 22 may comprise the following steps:

Step 200: Mold an outer shell 12.

Step 202: Place the VIP panels 16 on the inside of the outer shell 12. The VIP panels 16 may be placed against one or more of the outer shell bottom 24 and sides 26 to create an outer shell assembly.

Step 204: Transfer the pre-molded outer shell and VIP panel assembly to an insert molding machine. The insert molding machine may be an EPS or EPP molding machine having insert molding capability as described in more detail below.

Step 206: Position a male plug 54 within the outer shell and VIP panel assembly, leaving a space therebetween.

Step 208: Mold inner shell (14) into the space between the VIP panels 16 and the male plug 54. After molding the inner shell 14, the VIP panels 16 should be sandwiched between the outer shell 12 and inner shell 14 and enclosed therebetween so that the VIP panels 16 cannot be removed or even seen.

Similarly, the automated process for making the lid 18 may comprise the following steps:

Step 210: Mold the lid outer panel 42.

Step 212: Place a VIP panel 16 within the outer panel 42.

Step 214: Transfer the pre-molded outer panel 42 and VIP panel assembly to an insert molding machine.

Step 216: Position a male plug near the outer panel 42 and VIP panel assembly, leaving a space therebetween.

Step 218: Mold the inner shell (44) between the VIP panel and the male plug. After molding the inner shell 44, the VIP panel 16 should be sandwiched between the outer panel 42 and inner panel 44 and enclosed therebetween so that the VIP panel 16 cannot be removed or even seen.

Figure 10:
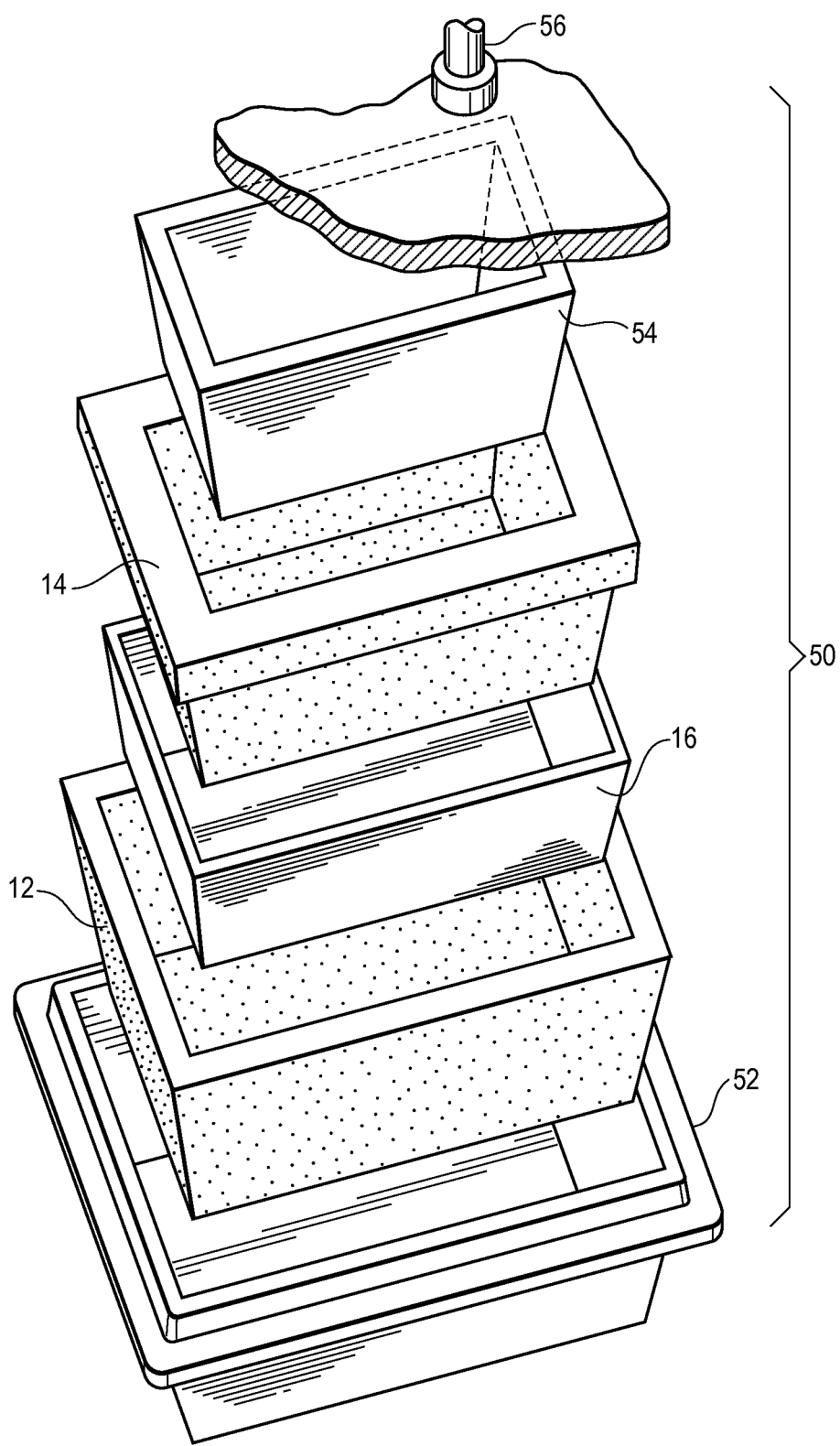
FIG. 10 is an exploded view of a molding assembly such as might be used to create the box portion of the thermally insulated VIP sandwich shipper of FIG. 1 via an automated process.

FIG. 10 is an exploded view of a molding assembly 50 such as might be used to create the box 22 via an automated process. The molding assembly 50 comprises components of the thermally insulated VIP sandwich shipper 10 and components of the insert molding machine. The components of the thermally insulated VIP sandwich shipper 10 shown in FIG. 10 are the outer shell 12, the inner shell 14 and five VIP panels 16, consisting of a bottom VIP panel 16 and four side VIP panels 16. The VIP panels 16 are shown as they would be arranged edge to edge within the outer shell 12. The components of the insert molding machine shown in FIG. 10 consist of an aluminum female plug 52, an aluminum male plug 54 and a fill gun 56.

The automated process has a number of advantages:

1. It can reduce the cycle time and assembly time to make the VIP sandwich shipper 10.

2. The insert molding can create a perfect seal line 58 between the outer shell 12 and the inner shell 14, making it difficult to distinguish where the outer shell 12 ends and the inner shell 14 starts. This perfect seal line 58 is possible due to the high temperature steam chest molding. The automated process also eliminates use of adhesive to seal the gap between outer shell 12 and the inner shell 14.

3. During high pressure steam chest molding every void/gap between VIP panels 16 and the walls of the outer shell 12 and the inner shell 14 will be filled with expanded bead foam, thus creating near hermetic seal.

4. High pressure molding helps push the VIP panels 16 against each other, thus virtually eliminating edge leaks.

INDUSTRIAL APPLICABILITY

The thermally insulated VIP sandwich shipper may be used in any industry where temperature sensitive products are shipped, including but not limited to the pharmaceutical, hospital and food industries.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed is:

1. A method of making a thermally insulated packaging system for a temperature sensitive payload, the method comprising the steps of:

Step 200: molding an outer shell, the outer shell having a bottom and sides extending from the bottom;

Step 202: placing a bottom VIP panel against the bottom of the outer shell and a side VIP panel against each of the sides of the outer shell to create an outer shell assembly, each side VIP having a top edge facing away from the bottom;

Step 204: transferring the outer shell assembly to a steam chest insert molding machine;

Step 206: positioning a male plug within the outer shell assembly, leaving a space therebetween;

Step 208: molding an inner shell into the space between the outer shell assembly and the male plug by high temperature and high pressure steam chest molding, thereby pushing the bottom and side VIP panels against each other, wherein the outer shell and inner shell have adjoining faces; and Step 210: applying a sealant between the adjoining faces of the outer shell and inner shell so the VIP panels are completely enclosed.

2. The method of claim 1 wherein:

Step 208 is carried out so that the top edge of each side VIP is covered by the inner shell.

3. A method of making a thermally insulated packaging system for a temperature sensitive payload, the method comprising the steps of:

Step 200: molding an outer shell, the outer shell having a bottom and sides extending from the bottom;

Step 202: placing a bottom VIP panel against the bottom of the outer shell and a side VIP panel against each of the sides of the outer shell to create an outer shell assembly, the bottom VIP panel and the side VIP panels forming a five sided housing, each side VIP panel having a top edge facing away from the bottom;

Step 204: transferring the outer shell assembly to a steam chest insert molding machine;

Step 206: positioning a male plug within the outer shell assembly, leaving a space therebetween; and Step 208: molding an inner shell such that it occupies the space between the outer shell assembly and the male plug and such that it covers the entire top edge of each side VIP panel, wherein during Step 208 the outer shell and the inner shell are sealed together along a perfect seal line so the VIPs are completely enclosed.

4. The method of claim 3 wherein:

during step 208 the bottom VIP panel and the side VIP panels are press fitted against the outer shell and the inner shell.

\* \* \* \* \*